United States Patent [19]

Klink et al.

[11] Patent Number: 5,548,341
[45] Date of Patent: Aug. 20, 1996

[54] TELEVISION RECEIVER WITH NON-LINEAR PROCESSING SELECTIVELY DISABLED DURING DISPLAY OF MULTI-IMAGE VIDEO SIGNAL

[75] Inventors: Kristopher A. Klink, Fishers; Gene K. Sendelweck, Indianapolis, both of Ind.

[73] Assignee: Thomson Consumer Electronics, Inc., Indianapolis, Ind.

[21] Appl. No.: 286,868

[22] Filed: Aug. 5, 1994

[51] Int. Cl.⁶ ............................ H04N 5/445; H04N 5/68; H04N 5/20
[52] U.S. Cl. ........................... 348/565; 348/380; 348/674
[58] Field of Search ............................ 348/380 OR, 565, 348/674–677, 706; H04N 5/45, 5/202, 5/59

[56] References Cited

U.S. PATENT DOCUMENTS

| 4,549,217 | 10/1985 | Sendelweck | 348/380 |
| 5,202,763 | 4/1993 | Sendelweck et al. | 348/674 |
| 5,202,765 | 4/1993 | Lineberry | 348/674 |
| 5,204,748 | 4/1993 | Lagoni | 348/380 |
| 5,210,606 | 5/1993 | Lagoni et al. | 348/528 |

*Primary Examiner*—Victor R. Kostak
*Assistant Examiner*—John W. Miller
*Attorney, Agent, or Firm*—Joseph S. Tripoli; Peter M. Emanuel; Richard G. Coalter

[57] ABSTRACT

A picture in picture (PIP) video signal is applied to a display device via a non-linear processor that is enabled during display of a main picture component and disabled during display of an inset picture component responsive to a PIP identification signal. The non-linear processor is formed in an integrated circuit which includes a pin for connection to a capacitor that stores peak levels of the PIP video signal. The PIP identification signal is subjected to a voltage level translation for varying the pin voltage over a range of values, ΔV, for facilitating ON/OFF operation of the non-linear processor and is applied to a selected plate of the capacitor for varying the pin voltage without substantial alternation of charge stored within the capacitor whereby only a single pin is required for both capacitor storage and on/off control of the non-linear processor and undesirable visual artifacts, such as "trailing contrast bars", are avoided.

13 Claims, 3 Drawing Sheets

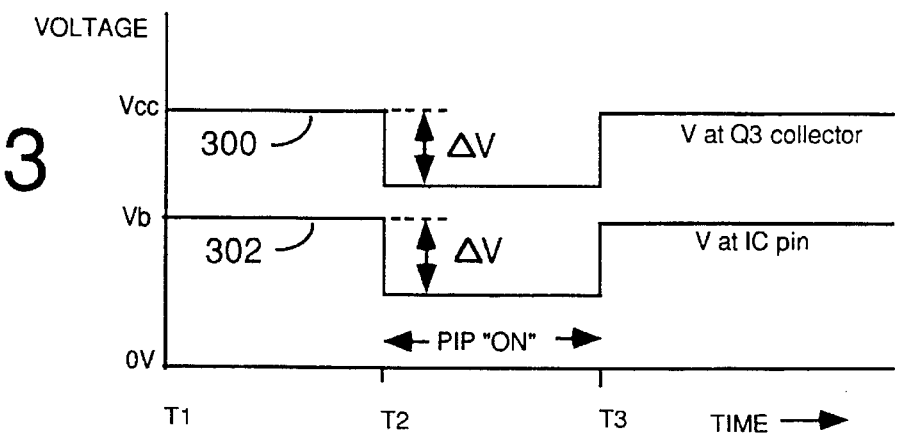
FIG. 3
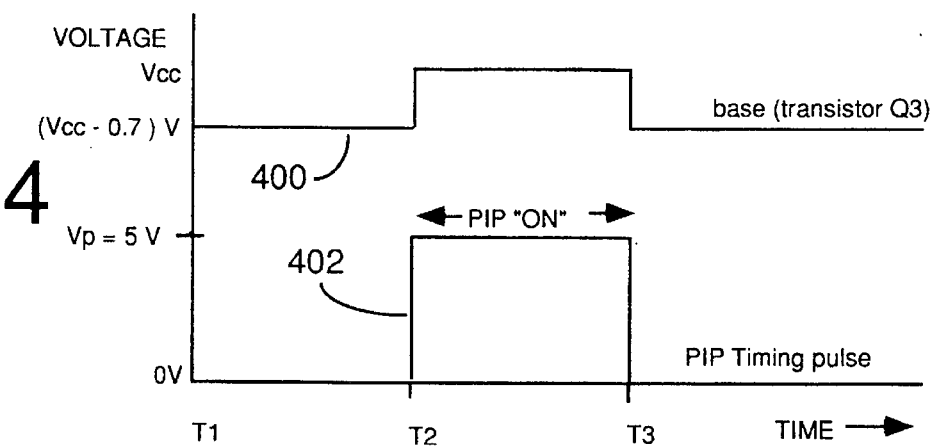
FIG. 4
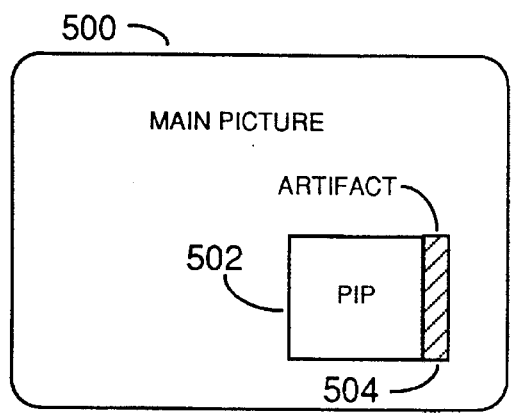
FIG. 5
FIG. 6

TELEVISION RECEIVER WITH NON-LINEAR PROCESSING SELECTIVELY DISABLED DURING DISPLAY OF MULTI-IMAGE VIDEO SIGNAL

FIELD OF THE INVENTION

This invention relates to television receivers and particularly to television receivers of a type (i) having both multi-image (i.e., "picture in picture" or "picture outside picture") processing and non-linear video processing, (ii) in which the non-linear processing is applied subsequent to combining the picture signals to be displayed together and (iii) in which the nonlinear processing is disabled during display of the multi-picture video signal.

BACKGROUND OF THE INVENTION

Television receivers are known which feature simultaneous display of pictures, e.g., picture-in-picture (PIP) or picture outside picture (POP) formats. In the picture in picture receivers an inset or "small" picture to be displayed within an area of a "main" or "large" picture is subjected to vertical and horizontal compression by means of selective storage and retrieval from a memory and the compressed picture video signal is inserted within an area of the main picture video signal by means of a multiplex switched that is controlled by timing signals provided by the picture in picture compression processor.

Examples of picture in picture compression processors are described, for example, by D. L. McNeely and R. T. Fling in U.S. Pat. No. 4,890,162 which issued Dec. 26, 1989 and by E. D. Romesburg in U.S. Pat. No. 4,768,083 which issued Aug. 30, 1988. Picture outside picture (POP) processing is similar except that the auxiliary video signal is combined with the main video signal to produce side by side images when displayed.

Non-linear video signal processors are known wherein a video signal is subjected to non-linear amplification within selected portions of the video signal range for providing improved detail in displayed images. O. H. Shade, for example, describes a non-linear video processor featuring both so-called "black stretch" and "white stretch" processing for improving detail in the darker and lighter areas of displayed images in U.S. Pat. No. 2,760,008 which issued Aug. 21, 1956.

It has been recognized as being desirable to provide both picture in picture processing and non-linear video signal processing (particularly "black stretch" processing) in a television receiver. Such a receiver is described by Lineberry in U.S. Pat. No. 5,202,765 entitled TELEVISION RECEIVER WITH PICTURE IN PICTURE AND NON-LINEAR PROCESSING which issued Apr. 13, 1993. In this receiver a form of non-linear (e.g., black stretch) processing is applied to a main video signal after the insertion of the compressed auxiliary video signal by the multiplex switch that combines the main and compressed video signals for display. Such a configuration provides a number of advantages over systems employing non-linear processing before picture-in-picture insertion for reasons discussed in detail by Lineberry in the patent.

The Lineberry system (100) is illustrated in block diagram form in FIG. 1 herein and comprises a picture in picture ("PIP" hereafter) processor 106 which receives main (S1) and inset (S2) picture video signals from respective sources (102 and 104). Processor 106 compresses the inset picture video signal S2 vertically and horizontally and includes a multiplex switch (not shown) that inserts the compressed inset picture video signal within the main picture video signal (S1) by means of time division multiplexing to provide luminance S3 and chrominance S4 output signals of PIP format. The luminance component S3 is applied to a non-linear processor 108 (e.g., a black stretch, white stretch or similar processor) to provide a non-linearly processed luminance PIP signal S5. The chrominance signal S4 and the non-linearly processed luminance signal S5 are then applied to a video display processor 110. This processor provides additional processing functions such as hue and saturation control, brightness and contrast control, RGB matrixing, etc. to the PIP video signal and the resultant processed video signal S6 is applied (e.g., in RGB component form) to a kinescope or other suitable display device 112. A PIP timing signal S7 is applied to an inhibit input of the non-linear processor 108 to enable the processor when the main picture signal S1 is being displayed and to disable the processor when the inset picture signal S2 is being displayed. As a result, the non-linear processing is applied to displayed images only in the main picture area and not in the inset picture area of the displayed images.

Advantageously, as explained by Lineberry, restricting non-linear processing to the main picture area is of particular significance in certain signal conditions in systems where nonlinear processing (e.g., black stretch) is applied subsequent to picture in picture insertion. Specifically, in such cases the insert picture black level may be modulated as the black stretch circuit dynamically adjusts for changes in the main picture scene content. In instances where the insert picture consists of relatively low IRE signal and the main picture consists of relatively high IRE signals, the insert picture can be "stretched" so far towards black level that its blacks are clipped and much of the detail lost. To a lesser extent, the black level of the main picture can be modulated as the black stretch circuits adjust for changing scene content in the insert picture. Because the insert picture is small in comparison to the main picture, this effect is not as great as the one noted above where the main picture is the predominant controlling factor. Accordingly, by disabling the non-linear processing when the inset picture is displayed, the luminance levels of the inset picture are not disturbed by the level of the main picture signal.

SUMMARY OF THE INVENTION

In the Lineberry system described above, and illustrated in FIG. 1 herein, the non-linear processor 108 is provided with an inhibit input to facilitate disabling of the non-linear processor 108 in response to the PIP timing pulse S7 provided by conductor 116. It is herein recognized as being desirable to incorporate the non-linear processor 108 within the video display processor 110 as an integrated circuit. This, however, presents a problem in that there is a premium placed on access "pins" for relatively large integrated circuits. In the Lineberry system the non-linear processor 108, in a specific embodiment, was provided by a relatively "small scale" integrated circuit exemplified by the Sony type CX20125 "Dynamic Picture Processor". This integrated circuit has an IC pin provided for disabling (inhibiting) the non-linear circuit operation. For larger circuits, which may include many other functions. (e.g., hue and saturation control, brightness and contrast control, etc.) there may be a problem with providing a separate integrated circuit pin dedicated only to the function of defeating the non-linear processing.

Accordingly, the present invention is directed in a first respect to meeting the need for a PIP system in which non-linear processing may be disabled during display of the inset picture without need for a separate integrated circuit pin for this purpose.

A multi-picture television system embodying the invention includes a first processor for combining first and second video signals to produce a combined video signal and for providing a picture identification signal for identifying the relative spatial locations of said first and second video signals. A non-linear processor couples combined video signal to a display device and subjects the coupled signal to non-linear processing. A control circuit, responsive to the picture identification signal, enables the non-linear processor during display of the one of the video signals and disables the non-linear processor during display of the other of the video signals. The non-linear processor is formed in an integrated circuit having a pin for connection to a capacitor which is coupled at a first plate thereof directly to the pin for storing a charge in the capacitor representative of a luminance level of the coupled signal produced by the non-linear processor. The control circuit comprises a voltage level translation circuit, responsive to the identification signal for applying a translated voltage to a second plate of the capacitor.

Advantageously, the same pin which facilitates storage of the luminance level in the capacitor also provides the dual function of controlling the enable/inhibit or "ON/OFF" operation thereby reducing the overall number of pins required by the integrated circuit.

Additionally, in accordance with a further aspect of the invention, a particular voltage range ΔV may be selected so as to make the ON/OFF operation of the non-linear circuit essentially invisible to the user. In this connection, it has been found that alteration of the stored capacitor voltage may tend produce unwanted visual artifacts herein called "trailing contrast bars" as shown in FIG. 5 (bar following PIP image) which is discussed in detail later. By selection of the value ΔV as described herein, it is possible to avoid such artifacts completely.

A method for processing a multi-picture television signal, in accordance with the invention, comprises combining first and second video signals to produce a combined video signal and a picture identification signal for identifying the relative spatial positions of the first and second video signals; coupling the combined video signal to a display device via a non-linear processor for subjecting the coupled signal to non-linear processing; forming the non-linear processor in an integrated circuit provided with a pin for connection to a capacitor; storing a charge in the capacitor representative of a luminance level of the coupled signal produced by the non-linear processor; and applying the identification signal to the capacitor for enabling the non-linear processor during display of one of the video signals in response to a first level of the identification signal and disabling the non-linear processor during display of the other of the video signals responsive to a second level of the identification signal.

BRIEF DESCRIPTION OF THE DRAWING

The invention is illustrated in the accompanying drawing wherein like elements are denoted by like reference designators and in which:

FIGS. 3 and 4 are waveform diagrams illustrating signal level and timing relationships in operation of the receiver of FIG. 1;

FIG. 5 is a pictorial diagram illustrating a potential visual artifact avoided by the receiver of FIG. 1;

FIG. 6 is a transfer function diagram of a black stretch processor suitable for use as a non-linear processor in the example of FIG. 1.

DETAILED DESCRIPTION

Figure 1:
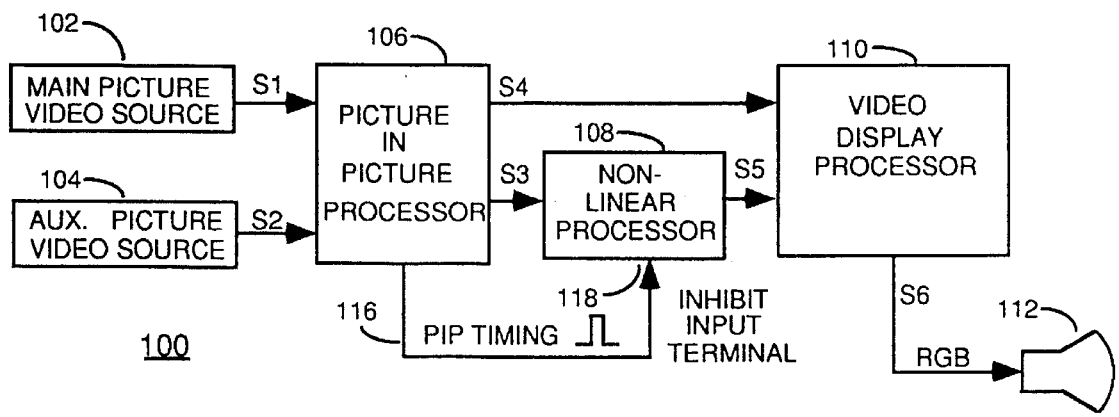
FIG. 1 is a block diagram, partially in schematic form, of a known television receiver having non-linear video processing and picture in picture processing.
Figure 2:
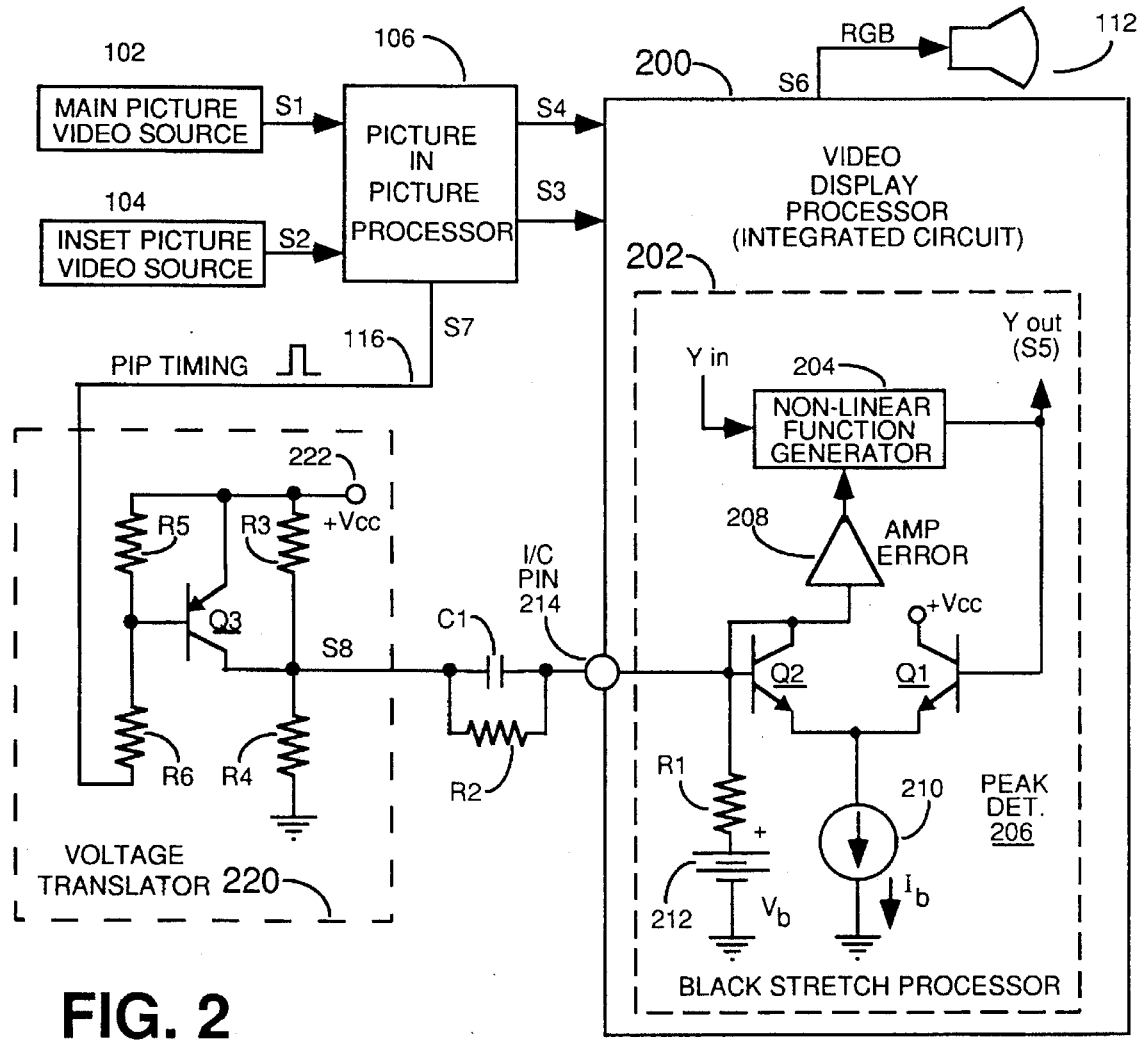
FIG. 2 is a block diagram, partially in schematic form, of a multi-image television receiver embodying the invention and employing picture in picture (PIP) processing.

The television receiver of FIG. 2 includes a picture in picture processor 106 which receives main (S1) and auxiliary (S2) video signals from respective ones of a main picture video source 102 and an auxiliary picture video source 104. The sources may comprise separate receiver tuners and detectors in the receiver or auxiliary video input signal sources or combinations of tuner and auxiliary video sources. The processor 106 is of conventional construction including compression circuitry for compressing the auxiliary picture video signal S2 vertically and horizontally and a multiplex switch for inserting the compressed auxiliary picture video signal within the borders of the main picture video signal by time division multiplexing to provide chrominance and luminance output signals, S4 and S3 respectively, of picture in picture format. Hereafter the compressed auxiliary video signal S2 which is inset within the main picture video signal will be referred to as the "inset" picture signal.

Processor 106 further provides a picture in picture identification signal S7 on conductor 116 which identifies the spatial position of the inset picture, i.e., the location or timing of the inset picture with respect to the main picture. In a conventional picture in picture processor, the timing signal S7 may be taken from the processor signal controlling the time division multiplex switch which inserts the insert picture into the main picture. The PIP timing pulse (signal S7) is illustrated in FIG. 4. For the specific embodiment under discussion, the pulse is low (zero volts) when the main picture is being displayed (time T1–T2 and T3 thereafter) and is high (e.g., +5 volts) when the inset picture is being displayed (T2–T3).

The picture in picture chrominance and luminance signals S4 and S3, respectively, are applied to respective inputs of a video display processor 200 which provides conventional video processing functions including, illustratively, hue and saturation control, brightness and contrast control and matrixing circuits for combining the processed signals to provide a picture in picture output signal S6 (which may be in RGB form as shown) for display by a display device 112 such as a kinescope.

In accordance with an aspect of the invention, the video display processor integrated circuit 200 further includes a non-linear processor 202 for subjecting the luminance component S3 of the picture in picture video signal to non-linear processing. This processing may be performed at various stages within the integrated circuit 200. A suitable location is after the brightness and contrast control processing and before matrixing to form the RGB output signals.

The particular non-linear processor 202 illustrated in the example of FIG. 2 is of the so-called "black stretch" type which improves contrast in low light scenes by increasing amplification of video signals of relatively low brightness level (e.g., a few IRE units). To this end the processor includes a non-linear transfer function generator 204 through which the luminance signal passes and the transfer function of the generator is altered by feedback as a function of the black level content of the video output signal.

FIG. 6 illustrates variations in the transfer function of processor 108 for various scene conditions. In FIG. 6 the point 610 represents a threshold of the black enhancement operation and may correspond, illustratively, to a video level near black of a few IRE units (e.g., 10 or 15% of peak white or 10–15 IRE units). Luminance video output signals above point 510 (e.g., relatively bright scenes) are linearly amplified along the segment 600. For luminance levels below the threshold 610 the amplification is variable ranging from linear amplification along segment 602, a higher level of amplification along segment 604 and a highest level of amplification along segment 606. To avoid visual artifacts due to abrupt changes in amplification, the gain of processor 204 is varied smoothly rather than in discrete steps as shown. In terms of picture black level content, scenes with an acceptable level of black peaks are amplified linearly along segments 602 and 600. In cases where the black peaks of a scene are less than the desired threshold, the gain is increased so that the processed signal has more gain in the low light regions and thus enhanced contrast.

To summarize, briefly, feedback control of the gain of the non-linear processor 204 is applied as a function of the video output signal to ensure that the displayed images include sufficient blacks to provide an image having a wide range of luminance tonalities from black to white. If a scene is lacking in blacks the video gain (i.e., contrast) is increased in the black region. Conversely, if the black content of a video signal satisfies a minimum threshold, then the video signal is passed without alteration of the gain in the black to gray region. Continuous gain changes below the threshold are desirable to avoid visual artifacts of the "black stretch" compensation to meet the desired luminance tonality range. Black stretch processing, applied this way, is capable of producing images having balanced (Black to White) tonality characteristics over a wide range of typical luminance levels encountered in video source material.

Feedback control of the non-linear function generator 204 (i.e., the black stretch gain) in non-linear processor 202 is provided by a peak detector (indicated generally as 206), a black reference bias voltage source 212 (indicated as a battery), an error amplifier 208 and a time constant circuit including a capacitor C1 and a resistor R2 coupled to a pin 214 of the integrated circuit 200.

Briefly stated, peak black levels of the video output signal of generator 204 are detected relative to a threshold bias voltage (Vb) provided by the source 212 by means of a detector 206 and stored by charging capacitor C1. The stored peak black error signal is fed back to the gain control input of generator 204 via an error amplifier 208 for controlling the transfer function as previously described. Reviewing, briefly, scenes with adequate peak black levels produce a feedback signal which maintains the gain of generator 204 at unity (no contrast enhancement). For scenes with black peaks less than the threshold value the error signal is increased to thereby increase the gain of generator 204 in low light areas. This increase continues until the modified scene includes black peaks comparable to the desired peak level set by the bias voltage Vb.

To avoid noticeable gain modulation with rapid scene changes, the time constant of the peak detector is selected to be relatively long (e.g., several seconds). The time constant is determined by the RC product of the value of capacitor C1 and its associated parallel connected discharge resistor R1. Exemplary values for these elements are 4.7 micro-Farads and 680 k-Ohms, respectively, yielding a time constant of a little over three seconds.

In more detail, black peak detector 206 comprises a pair of emitter coupled NPN transistors Q1 and Q2 supplied with emitter bias current Ib from a bias current source 210. Transistor Q1 is connected at the collector thereof to a source of positive supply voltage +Vcc and at the base thereof to the output of generator 204. Transistor Q2 is "diode connected", that is, the collector and base electrodes thereof are joined and coupled to the integrated circuit pin 214, to the input of error amplifier 208 and, via resistor R1 to a source 212 of bias potential (Vb) illustrated as a battery.

In operation of non-linear processor 202, peaks in the black direction (decreasing voltage) of the video output signal applied to the base of transistor Q1 will bias transistor Q1 off causing capacitor C1 to be charged by the current Ib provided by the current source 210. In this manner, charge accumulates in capacitor C1 in proportion to the black level of displayed images. A reduction in voltage at pin 214 signifies excessive blacks present in a scene and as applied to generator 204 results in a reduction in the black stretch gain. Conversely, an increase in voltage at pin 214 corresponds to a scene lacking in black content to which processor 108 responds by increasing the black stretch gain. This action continues until an equilibrium condition is met wherein the black peaks of the video output signal are enhanced sufficiently to turn on transistor Q1 and stabilize the charge on capacitor C1. As previously discussed, the resistor R2 "bleeds" charge from capacitor C1 to establish a relatively long time constant (e.g., 3 seconds or so, for the exemplary values stated) so as to avoid the undesirable effect of "visual pumping" of the black stretch low light contrast enhancement. The term "visual pumping" refers to the temporal/visual artifact of noticeable contrast variations due to over-rapid changes in low level video gain.

Considering now the ON/OFF control of non-linear processor 202, it will be noted from the discussion above that the black stretch gain is controlled by the voltage at pin 214 and is proportional to the peak black level of the processed video output signal. If one were to apply an external voltage to I/C pin 214 sufficient to bias transistor Q2 off, the feedback loop would be broken and the black stretch processing would be "defeated" (i.e., inhibited or turned OFF). Although this end result is an object of the present invention for purposes of disabling processing during display of the inset picture, it can not be achieved by a direct alteration of the picture in picture (PIP) identification signal S7 to I/C pin 214. The reason why it is impossible for a direct application of voltage to pin 214 to be used for ON/OFF control of the non-linear processor is that it can not be done without experiencing an undesirable visual artifact herein denoted as "trailing contrast bars" and shown in FIG. 5.

The potential visual artifact of "trailing contrast bars" is illustrated in FIG. 5 where the area 500 represents the display of the main picture video signal S1, the area 502 represents the display of the picture in picture (PIP) video signal S2 and the shaded area 504 represents a "trailing contrast bar". This artifact may be isolated for study by applying a flat field luminance level (e.g., 20 IRE) to the main and inset picture inputs of processor 106 and by attempting to defeat the non-linear processing of the inset picture signal by direct application of the PIP identification signal on conductor 116 to pin 214 of I/C 200. Under these conditions, an area 504 immediately following the right border of the PIP signal will have a shifted luminance level different from the 20 IRE input signals.

It has been found that the cause of this artifact is that direct application of voltage to pin 214 will result in a change in charge on capacitor C1. Since the C1 charge represents the black correction level and controls the gain of the non-linear processor, alteration of the charge will affect the contrast of displayed images after the PIP interval until the capacitor C1 charge is re-established. This may take a few microseconds, long enough to produce a noticeable contrast change bar following the right margin of the PIP image as illustrated by the artifact 504.

In accordance with a further aspect of the invention, it has been found that the black stretch circuit operation may be defeated without introducing undesired "contrast bars" if (i) the ON/OFF control voltage change is of limited amplitude, $\Delta V$; and (ii) the ON/OFF voltage is applied to the plate of capacitor C1 that is not connected to I/C pin 214.

The foregoing features of the invention are provided by means of a voltage translator 220 (outlined in phantom) in FIG. 2 comprising four resistors R3–R5 and a PNP transistor Q3. These elements are connected, as will be described to provide the three functions of:

(1) translating the amplitude of the PIP timing signal pulse S7 on conductor 116;

(2) restricting the magnitude of the translated voltage change $\Delta V$; and (3) applying the resultant translated and limited signal S8 to the plate of capacitor C1 that is not connected to I/C pin 214.

In more detail, in voltage translator 220 the PIP timing signal S7 on conductor 116 is applied to the base of PNP transistor Q3 via a current limiting resistor R6. Transistor Q3 is connected at the emitter thereof to a source of positive supply 222 voltage +Vcc and is turned on (saturated) by current provided by resistor R6 when the main picture video signal is being displayed (timing signal S7 at zero volts). When the inset picture video signal is being displayed (timing signal S7 at +5 volts) transistor Q3 is turned off by means of a turn-off bias resistor R5 coupled between its base and emitter electrodes. The base voltage variation of transistor Q3 described above is illustrated in FIG. 4 by waveform 400 which represents the base voltage of transistor Q3.

Step (2) above is implemented in the voltage translator 220 by the resistive voltage divider comprising resistors R3 and R4 coupled between the collector of transistor Q3 and respective ones of the supply terminal 222 and ground. This connection restricts the transistor Q3 collector voltage to a range from Vcc to Vcc-$\Delta V$. Signal S8 is equal to Vcc during the main picture video interval when transistor Q3 is saturated in response to the PIP identification signal being at the zero volt level. This is illustrated in FIG. 3 by waveform 300 which shows the transistor Q3 collector voltage. The change in voltage, $\Delta V$, is determined by the value of Vcc and the values of resistors R3 and R4 in accordance with the following relationship:

$$\Delta V = Vcc - Vcc[R4/(R4+R3)]$$

From the foregoing expression the values of resistors R3 and R4 should be selected to be less than the value of the time constant resistor R2 to ensure that the full voltage change is communicated via capacitor C1 to terminal 214.

Selection of the value of the voltage change, $\Delta V$, which provides ON/OFF control of the non-linear processor, without producing visible artifacts, depends upon the operating voltage range of the peak detector 206 between peak white and black levels. In an exemplary embodiment of the invention for the particular detector shown, typical peak levels were 4.4 volts for zero IRE levels and 5.0 volts for 100 IRE levels giving a difference value for $\Delta V$ of 0.6 volts. This voltage represents the full gain control range of the processor between the extremes of linear control (no black stretch gain enhancement) to maximum black boost (the maximum gain of the non-linear processor).

The final step of applying the control signal S8 to the I/C pin 214 without altering the charge on capacitor C1 is implemented by connecting the output (collector of Q3) of the voltage translator 220 to the plate of capacitor C1 most distant from pin 214, i.e., the "distal" plate of the capacitor as distinguished from the "proximate" plate that is directly connected to pin 214.

Recall that direct application of a voltage to pin 214 from a low impedance source will cause a change in stored charge resulting in trailing contrast bars. Applying the signal S8 to the distal plate of capacitor C1 avoids this problem completely. The capacitor, in effect, acts as a voltage level shifter since the charge on the capacitor can not change instantaneously and so when $\Delta V$ is applied to its distal plate, the proximate plate voltage instantly changes by the same amount. Thus, during the picture in picture interval T2–T3 of FIG. 3 the voltage at I/C pin 214 changes by exactly $\Delta V$ thereby disabling the non-linear processing during display of the inset picture video signal. Accordingly, the overall system provides displayed images in which non-linear processing is applied to the main picture area but not to the inset picture area. Advantageously, the processing is provided in an integrated circuit in which a common pin provides both peak detection and on/off control functions and which the problem of trailing contrast bars is avoided.

To briefly summarize the example of FIG. 2, the multi-picture television system there described includes a first processor (106) for combining first and second video signals to produce a combined video signal (S3) and a picture identification signal (S7) for identifying the relative spatial locations of said first and second video signals. A second processor (202) couples the combined video signal to a display device (112) and for subjecting the coupled signal to non-linear processing. The non-linear processor is formed in an integrated circuit (200) and has a pin 214 for connection to a filter R1C1 for developing a signal representative of a given amplitude parameter (e.g., the black level) of the coupled signal. A control circuit (220) (e.g., a voltage translator) is coupled to the filter. The control circuit being responsive to a first condition (e.g., zero volts) of the identification signal for enabling non-linear processing in the second or "non-linear" processor during display of one of said video signals and is responsive to a second condition of the identification signal for modifying the signal developed by the filter (e.g., shifting the pin voltage down by $\Delta V$) for disabling non-linear processing in the second processor during display of the other of the video signal signals.

Various changes may be made to the example of the invention shown in FIG. 2. In a wide screen television system, for example, where display 112 has a wide aspect ratio (e.g., 16:9 as compared with the standard 4:3 aspect ratio of conventional displays), one may replace the picture in picture processor 106 (PIP) with a picture outside picture processor (POP) and utilize the principles of the invention for preventing the main picture video from altering the contrast of the picture outside picture video. Such a system is illustrated in FIG. 7 wherein the system of FIG. 2 has been modified.

Figure 7:
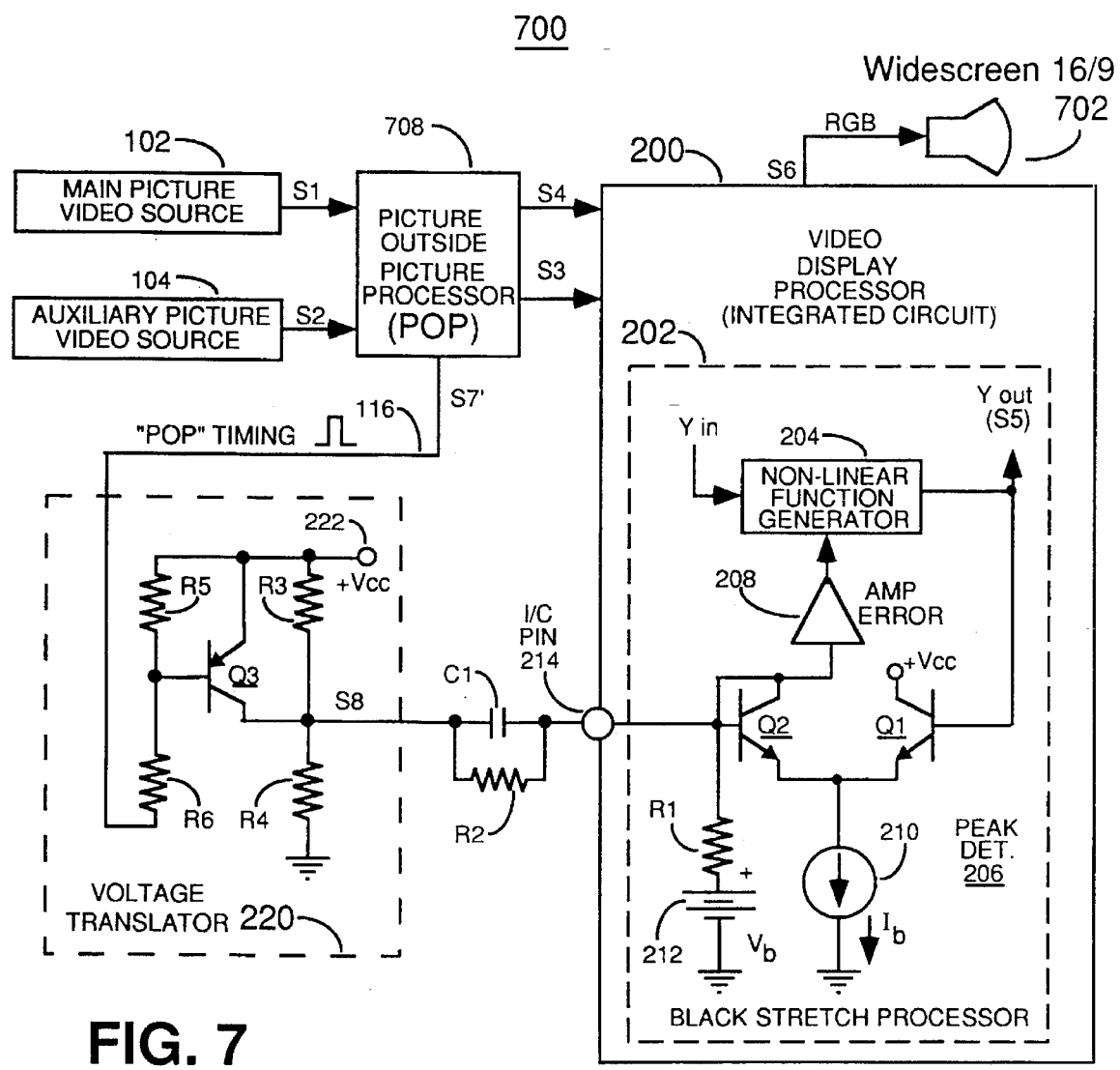
FIG. 7 illustrates a modification of the multi-image receiver of FIG. 2 for processing picture outside picture (POP) video signals.

Specifically, in FIG. 7 the display device 112 has been replaced by a wide aspect ratio display device 702 having an aspect ratio greater than 4:3 (e.g., a width to height ratio of 16:9) and the picture in picture processor 106 has been replaced by a picture outside picture processor 708. This processor, like the processor 106, compresses the auxiliary video signal S2 but places the compressed picture (by time division multiplexing) outside of the borders of the main picture video signal S1 rather than inside the borders of the main picture video signal S1. The timing signal S7' produced by the picture outside picture processor 708 thus represents the location of the compressed smaller picture outside the borders of the main picture signal rather than inside the borders. Operation of the system of the picture outside picture (POP) example of FIG. 7 is otherwise the same as previously described for the picture in picture (PIP) example of FIG. 2 whereby the non-linear processing applied to the main picture video signal S1 is not applied to the auxiliary (picture outside picture, POP) video signal S2 displayed on the wide screen display device 702.

What is claimed is:

1. A method for processing a multi-picture television signal; comprising:

combining first and second video signals to produce a combined video signal and a picture identification signal for identifying the relative spatial positions of said first and second video signals;

coupling the combined video signal to a display device via a non-linear processor for subjecting the coupled signal to non-linear processing;

forming said non-linear processor in an integrated circuit provided with a pin for connection to a capacitor;

storing a charge in said capacitor representative of a luminance level of said coupled signal produced by said non-linear processor;

applying said identification signal to said capacitor for enabling said non-linear processor during display of one of said video signals in response to a first level of said identification signal and disabling the non-linear processor during display of the other of said video signals responsive to a second level of said identification signal.

2. A method as recited in claim 1 further comprising:

translating said identification signal to a predetermined voltage range, $\Delta V$, and applying the translated identification signal to a plate of said capacitor other than a plate connected to said pin.

3. A method as recited in claim 2 further comprising:

providing a parallel discharge path for said capacitor of a given impedance; and limiting the effective source impedance of said translated identification signal to a value less than said given impedance.

4. A method as recited in claim 1 further comprising:

translating said identification signal to a predetermined voltage range, $\Delta V$, and applying the translated identification signal to a plate of said capacitor other than a plate connected to said pin;

providing a parallel discharge path for said capacitor of a given impedance; and limiting the effective source impedance of said translated identification signal to a value less than said given impedance.

5. A multi-picture television system comprising:

a first processor for combining first and second video signals to produce a combined video signal and a picture identification signal for identifying the relative spatial locations of said first and second video signals;

a non-linear processor for coupling the combined video signal to a display device and for subjecting the coupled signal to non-linear processing;

a control circuit, responsive to said picture identification signal for enabling said non-linear processor during display of the one of said video signals and for disabling the non-linear processor during display of the other of said video signals; and wherein:

said non-linear processor being formed in an integrated circuit having a pin for connection to a capacitor;

said capacitor having first and second plates, said first plate being coupled to said pin for storing a charge in said capacitor representative of a luminance level of said coupled signal produced by said non-linear processor; and said control circuit comprises a voltage level translation circuit, responsive to said identification signal for applying a translated voltage to said second plate of said capacitor.

6. A television system as recited in claim 5 wherein said voltage translator includes means for limiting the voltage applied to said second plate of said capacitor to a particular range, $\Delta V$, said range $\Delta V$ being selected for suppressing trailing bar artifacts in said displayed images.

7. A television system as recited in claim 5 further comprising a resistor connected in parallel with said capacitor and wherein said voltage translator exhibits an effective output impedance less than the value of said resistor.

8. A television system as recited in claim 5 further comprising:

a resistor connected in parallel with said capacitor and wherein:

said voltage translator exhibits an effective output impedance less than the value of said resistor; and wherein said voltage translator includes means for limiting the voltage applied to said second plate of said capacitor to a particular range, $\Delta V$, said range $\Delta V$ being selected for suppressing trailing bar artifacts in said displayed images.

9. A method for providing multi-picture non-linear processing, comprising:

time division multiplexing a main picture video signal with an auxiliary video signal to form a multi-picture video signal;

providing a picture identification signal distinguishing said main and auxiliary video signal components of said multi-picture video signal;

coupling said multi-picture video signal to a display device via a non-linear video processor;

enabling said non-linear processor during display of said main picture video signal and inhibiting said non-linear processor during display of said auxiliary video signal under control of said identification signal;

forming said non-linear processor in an integrated circuit which includes a pin for connection to a capacitor;

storing in said capacitor a peak level of the multi-picture video signal produced at an output of said non-linear processor;

applying said identification signal to said capacitor for enabling and inhibiting operation of said non-linear processor.

10. A method as recited in claim 9 further comprising:

translating the identification signal applied to said capacitor to a particular voltage range, $\Delta V$;

applying the translated identification to said pin via said capacitor;

providing a parallel discharge path for said capacitor of a given impedance; and providing a source impedance for the translated identification signal that is less than said given impedance.

11. A multi-picture television system comprising:

a first processor for combining first and second video signals to produce a combined video signal and a picture identification signal for identifying the relative spatial locations of said first and second video signals;

a second processor for coupling the combined video signal to a display device and for subjecting the coupled signal to non-linear processing;

said second processor being formed in an integrated circuit and having a pin for connection to a filter;

said filter being coupled to said pin for developing a signal representative of a given amplitude parameter of said coupled signal; and a control circuit coupled to said filter;

said control circuit being responsive to a first condition of said identification signal for enabling non-linear processing in said second processor during display of one of said video signals;

said control circuit being responsive to a second condition of said identification signal for modifying said signal developed by said filter for disabling non-linear processing in said second processor during display of the other of said video signal signals.

12. A method for providing picture in picture processing, comprising:

multiplexing a main picture video signal with a compressed inset picture video signal to form a picture in picture video signal and a picture in picture identification signal;

coupling said picture in picture video signal to a display device via a non-linear video processor;

enabling said non-linear processor during display of said main picture video signal and inhibiting said non-linear processor during display of said inset picture video signal under control of said identification signal;

characterized by forming said non-linear processor in an integrated circuit which includes a pin for connection to a capacitor;

storing in said capacitor a peak level of the picture in picture video signal;

subjecting said identification signal to a voltage level translation for varying the pin voltage within a predetermined range of voltages, $\Delta V$, for enabling and inhibiting operation of said non-linear processor; and varying said pin voltage without substantial alteration of charge stored within said capacitor.

13. A method as recited in claim 12 wherein the step of varying said pin voltage comprises applying said voltage level translated identification signal to a plate of said capacitor that is not connected to said pin of said integrated circuit.

* * * * *